United States Patent
Iwamoto

(10) Patent No.: US 7,488,528 B2
(45) Date of Patent: Feb. 10, 2009

(54) COLOR IMAGE FIXING BELT

(75) Inventor: Toshiaki Iwamoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 205 days.

(21) Appl. No.: 11/434,298

(22) Filed: May 15, 2006

(65) Prior Publication Data

US 2006/0263555 A1    Nov. 23, 2006

(51) Int. Cl.
*B32B 25/20* (2006.01)
*B32B 27/34* (2006.01)
*B32B 33/00* (2006.01)
*G03G 15/20* (2006.01)

(52) U.S. Cl. .................... 428/141; 428/473.5; 428/447; 399/333

(58) Field of Classification Search ........................ None
See application file for complete search history.

(56) References Cited

U.S. PATENT DOCUMENTS 5,411,779 A * 5/1995 Nakajima et al. ........ 428/36.91
6,201,945 B1 * 3/2001 Schlueter et al. ............ 399/329

FOREIGN PATENT DOCUMENTS

JP    2003114585    4/2003

* cited by examiner

*Primary Examiner*—Ramsey Zacharia
(74) *Attorney, Agent, or Firm*—Fulbright & Jaworski LLP

(57) ABSTRACT

There is provided a fixing belt that has sufficient fixing performance even at high sheet-feeding speeds of 100 ppm or more, does not cause offset even with respect to color toners, produces glossy high-quality images at the level of photograph image quality, and has high durability such that mechanical strength or image quality can hardly be reduced during continuous operation. The color image fixing belt of the invention is characterized by being made of a polyimide resin and has an inner diameter of no less than 300 mm, and the outer circumference surface of the belt has a surface roughness (Rz) of 1 μm or less.

4 Claims, No Drawings

COLOR IMAGE FIXING BELT

BACKGROUND OF THE INVENTION

1. Field of the Invention

The invention relates to a fixing belt that can produce high-quality color images when used as a fixing belt in an image-forming device such as a copying machine and a printing machine.

2. Description of the Related Art

Conventionally, fixing methods using heat, pressure or a combination thereof have been proposed for fixing of images on a transfer paper sheet or the like in the image-forming device. Examples of such methods include oven fixing methods, flash fixing methods, pressure fixing methods, and hot roller fixing methods. In particular, the hot roller fixing methods are widely used in view of thermal efficiency, combustion risk, fixing properties, or the like. In the hot roller fixing method, a hot roller and a press roller are arranged opposite to each other, and a transfer paper sheet is fed between both rollers. In this method, a toner provisionally fixed on the transfer paper sheet is fused and fixed by the generation of heat from a heater embedded in the hot roller, and the fixing is reinforced by pressing with the press roller, so that images are formed with the toner on the transfer paper sheet. Such a hot roller fixing method, however, requires high pressure load for the fusion and fixation of the toner on the transfer paper sheet, because of small contact area.

Against the problem, belt fixing methods are proposed. This method includes arranging a roller and a belt opposite to each other and feeding a transfer paper sheet between them to fix a toner. This method also needs basic functions including pressing, heating, driving, and releasing, like the hot roller fixing method, but these functions may be performed by any of the roller and the belt. A belt with high following performance provided on one side can increase the contact area and reduce the pressure load. In the belt fixing method, however, an increase in sheet-feeding speed leads to an increase in pressure load, and thus, there is proposed a fixing belt having a fluoroplastic layer with improved wear resistance of release layer. Japanese Patent Application No. 2003-114585 has proposed a fixing belt having a fluoroplastic layer with improved wear resistance of release layer.

BRIEF SUMMARY OF THE INVENTION

Recently, there have been strong demands for an increase in sheet-feeding speed and for high-quality image formation, and thus, it is necessary to further increase the per-unit-time contact area of the fixing belt for a sheet-feeding speed of more than 100 ppm. If the sheet feeding speed is beyond 100 ppm, the pressure load between the rollers must be increased, and thus the production of glossy high-quality images at the level of photograph image quality should strongly require a fixing belt that can offer high toner-fixing performance and be prevented from causing offset, even at high sheet-feeding speeds.

It is therefore an object of the invention to provide a fixing belt that offers sufficient fixing performance even at high sheet-feeding speeds of 100 ppm or more, does not cause offset even with respect to color toners, produces glossy high-quality images at the level of photograph image quality, and has high durability such that mechanical strength or image quality can hardly be reduced during continuous operation.

The inventors have made active investigations to achieve the above object and have finally found that a fixing belt that offers outstanding performance can be obtained by setting the inner diameter of a polyimide resin fixing belt at a specific value or more and setting the surface roughness of the outer circumference surface of the belt within a specific range and making the outer circumference surface specular and further using polyimide of a specific composition, so that the invention has been completed.

Thus, the invention is directed to a color image fixing belt comprising a belt which is made of a polyimide resin and has an inner diameter of no less than 300 mm and whose outer circumference surface has a surface roughness (Rz) of 1 μm or less. Each physical property defined with respect to the invention may be measured by the method as described in the examples below.

In the invention, the outer circumference surface of the belt preferably has a gloss value of no less than 100 with respect to glossiness measured at a light receiving angle of 20°. The glossiness value may be measured by the method as described in the examples below.

In the invention, the belt preferably has a tensile strength of no less than 150 MPa. The tensile strength value may be measured by the method as described in the examples below.

The belt is preferably made of a copolymer of 3,3',4,4'-biphenyltetracarboxylic dianhydride, p-phenylenediamine (PDA) and 4,4'-diaminodiphenyl ether (DDE), in which the molar composition ratio of PDA and DDE (PDA/DDE) is in the range of 5/5 to 9/1.

A release layer is preferably further stacked on the outer circumference surface of the belt, and the release layer is preferably made of a resin selected from the group consisting of a fluoroplastic, a silicone rubber and a silicone resin.

The fixing belt of the invention has an inner diameter of 300 mm or more and thus can provide sufficient contact area even at a high sheet-feeding speed of 100ppm so that it offers high fixing performance and does not cause offset with respect to color toners. The belt whose outer circumference surface has a surface roughness (Rz) of 1 μm or less has high smoothness. The belt whose outer circumference surface has a gloss value of 100 or more with respect to glossiness measured at a light receiving angle of 20° has high specularity and can produce high-quality images at the level of photograph image quality. The belt having a tensile strength of 150 MPa or more can be durable to continuous high-speed sheet feeding. The belt made of a copolymer of 3,3',4,4'-biphenyltetracarboxylic dianhydride, p-phenylenediamine (PDA) and 4,4'-diaminodiphenyl ether (DDE) with a PDA/DDE molar composition ratio of 5/5 to 9/1 possesses both stiffness and flexibility and thus, can produce a durability effect in a more preferred manner. The fixing belt further having a release layer that is stacked on the outer circumference surface and made of at least one of a fluoroplastic, a silicone rubber, and a silicone resin can have good toner release properties and show good sheet separation properties in printing machines or the like. The belt of the invention can be preferably used as a fixing belt for color image-forming devices and is particularly useful for fixing at high sheet-feeding speeds of more than 100 ppm. Even at higher sheet-feeding speeds, the belt of the invention can be expected to have high durability.

DETAILED DESCRIPTION OF THE INVENTION

The invention is described in detail below.

The color image fixing belt of the invention is made of a polyimide resin and has an inner diameter of 300 mm or more, preferably an inner diameter of 330 mm or more. The inventors have found that the fixing belt with an inner diameter of 300 mm or more can provide increased contact area even at high sheet feeding speeds of 100 ppm or more and can hardly cause fixing failure events. If the inner diameter of the belt is less than 300 mm, the contact area may be insufficient so that fixing failure easily occurs.

The outer circumference surface of the belt has a surface roughness (Rz) of 1 μm or less, preferably of 0.8 μm or less. If the surface roughness is more than 1 μm, it can be difficult to produce glossy images. As the surface roughness (Rz) is reduced, unevenness in fixing can effectively be suppressed, which would otherwise be caused by variations in the thickness of stacked layers or variations in the pressure applied to unfixed toner images being pressed onto the recording material. While the fixing belt may have any thickness, it preferably has a thickness in the range of 5 to 200 μm.

The outer circumference surface of the belt preferably has a gloss value of 100 or more, more preferably of 120 or more, with respect to glossiness measured at a light receiving angle of 20°. If the glossiness is 100 or more in terms of gloss value, the belt can be highly specular and produce glossy high-quality images at the level of photograph image quality.

The tensile strength of the belt is preferably 150 MPa or more, more preferably 200 MPa or more. The belt with a tensile strength of 150 MPa or more can still withstand continuous high-speed sheet feeding. A belt with a tensile strength of less than 150 Mpa tends to tear when driven. Such a belt also tends to rupture, because it is kept tight on a hot roll, a separation roll, a transfer roll, or the like and can be driven while always being in contact with the hot roll above 150° C.

While any known polyimide resin that has been used in the field of fixing belts and the like may be used for the belt of the invention, aromatic polyimide resins are preferably used in view of heat resistance and mechanical strength. Specifically, the polyimide resin may be prepared by a process including the steps of dissolving substantially equimolar amounts of a tetracarboxylic dianhydride (an acid component) and a diamine (an amine component) in an appropriate solvent and allowing them to react with each other to form a poly(amic acid) solution and evaporating the solvent and then subjecting the material to polymerization (imide conversion) at high temperatures. In particular, the belt is preferably made of a copolymer of 3,3',4,4'-biphenyltetracarboxylic dianhydride (BPDA), p-phenylenediamine (PDA) and 4,4'-diaminodiphenyl ether (DDE) with a PDA/DDE molar composition ratio of 5/5 to 9/1, more preferably with a PDA/DDE molar composition ratio of 6/4 to 8/2. The copolymer with a molar composition ratio in the above range can have both stiffness and flexibility and have higher heat resistance, mechanical strength, dimensional stability, or the like and thus, can provide a durability effect in a more preferred manner. If the molar composition ratio is 10/0, the stiffness can be so high that the flexibility can be lower. If the composition of DDE is higher than 5/5 in the molar composition ratio, the flexibility may be so high that the belt ruptures or has degraded creep properties. The polyimide resin may be a multilayer laminate.

In the invention, a release layer is preferably further stacked on the outer circumference surface of the belt, and the release layer is preferably made of a resin selected from the group consisting of a fluoroplastic, a silicone rubber and a silicone resin, more preferably made of a silicone resin. The stacked release layer can form a fixing belt that has good toner release properties and shows good sheet separation properties in printing machines or the like.

Any fluoroplastic having a fluorine atom(s) in its molecule may be used as the fluoroplastic material without particular limitation. Examples of the fluoroplastic include polytetrafluoroethylene (PTFE) and modifications thereof, tetrafluoroethylene-perfluoroalkyl vinyl ether copolymers (PFA), tetrafluoroethylene-ethylene copolymers (ETFE), tetrafluoroethylene-hexafluoropropylene copolymers (FEP), tetrafluoroethylene-vinylidene fluoride copolymers (TFE/VdF), tetrafluoroethylene-hexafluoropropylene-perfluoroalkyl vinyl ether copolymers (EPA), polychlorotrifluoroethylene (PCTFE), chlorotrifluoroethylene-ethylene copolymers (ECTFE), chlorotrifluoroethylene-vinylidene fluoride copolymers (CTFE/VdF), polyvinylidene fluoride (PVdF), and polyvinyl fluoride (PVF). In view of wear resistance, release performance from toners, and heat resistance, PTFE, PFA and a mixture thereof are preferred, and PFA is particularly preferred.

In a case where PFA is used as the fluoroplastic, the PFA preferably forms particles with an average particle size of 0.1 to 5.0 μm. Particles with an average particle size of less than 0.1 μm tend to aggregate and can show uneven distribution of particle sizes, and applying and heating such particles tends to cause an abnormal projection. If the average particle size is more than 5.0 μm, the coating film formed by applying and heating the particles tends to have a rough surface.

Specifically, the silicone resin is preferably produced with a solvent addition type silicone or a curable silicone such as a condensation curable silicone, as described below, and particularly preferably produced with a solvent addition type silicone.

The solvent addition type silicone may be prepared by allowing methylhydrogenpolysiloxane to react with straight chain methylvinylpolysiloxane having vinyl groups at both ends or at both ends and in the chain in the presence of a platinum-based catalyst.

Examples of the solvent addition type silicone include KS-887, KS-779H, KS-778, KS-835, X-62-2456, X-62-2494, X-62-2461, KS-3650, KS-3655, KS-3600, KS-847, KS-770, KS-770L, KS-776A, KS-856, KS-775, KS-830, KS-830E, KS-839, X-62-2404, X-62-2405, KS-3702, X-62-2232, KS-3503, KS-3502, KS-3703, and KS-5508, all manufactured by Shin-Etsu Chemical Co., Ltd. KS-887 is particularly preferred.

Examples of the condensation curable silicone preferably include KS-881, KS-882, KS-883, X-62-9490, and X-62-9028, all manufactured by Shin-Etsu Chemical Co., Ltd.

The release layer preferably has a thickness of 3 to 100 μm, more preferably of 5 to 30 μm. A release layer with a thickness of less than 3 μm may have insufficient durability. A release layer with a thickness of more than 100 μm may increase the heat capacity of the fixing film and thus increase the rise time.

Adhesive treatment with a primer or the like may be performed to form a primer layer between the polyimide resin and the release layer such that adhesion between them can be improved. In this mode, the primer layer preferably has a thickness in the range of 0.3 to 5.0 μm. A primer layer with a thickness of less than 0.3 μm tends to have low adhesion, while a primer layer with a thickness of more than 5.0 μm tends to be brittle. A variety of commercially available primers may be used for the primer layer to enhance the adhesion between the belt and the release layer, and polyimide-based primers are preferably used with respect to the polyimide resin belt.

In the fixing belt of the invention, the polyimide resin layer, the release layer, or the primer layer may optionally contain thermally conductive particles such as particles of aluminum nitride, boron nitride, alumina, silicon carbide, or silica, in order to have increased thermal conductivity, or may optionally contain electrically conductive particles such as particles of carbon black or graphite or a metal powder such as a copper powder, in order to prevent the generation of frictional static electricity.

The fixing belt of the invention may be used for a fixing unit of an image-forming device such as a copying machine and a printing machine, particularly preferably for a fixing unit of a color image-forming device, while it may be used for any type of fixing unit using a belt fixing method. The invention is particularly useful for fixing at high sheet-feeding speeds of more than 100 ppm and is also expected to provide high durability even at high sheet-feeding speeds.

EXAMPLES

Examples are described below to more specifically describe the structure and effects of the invention. The measurement described below was performed on the test or evaluation item in the examples.

Evaluation Test Methods

Surface Roughness (Rz)

Based on JIS B 0601 (1994), measurement was performed using Surftest SJ-301 manufactured by Mitutoyo Corporation.

Glossiness (Gloss Value)

According to JIS Z 8741, ISO 2813, ASTM D 523, and DIN 67530, measurement was performed at a light-receiving angle of 20° using a handy glossmeter PG-1M manufactured by Nippon Denshoku Industries Co., Ltd.

Tensile Strength

In the longitudinal direction of the belt, samples were cut in the form of No. 3 type dumbbells (JIS K 6301) by stamping and then each measured with ORIENTEC UTM1,000 Tensilon (manufactured by ORIENTEC Co., Ltd.) under the conditions of a tension rate of 100 mm/minute and a chuck distance of 30 mm.

Example 1

In 1537 g of N-methyl-2-pyrrolidone (NMP) were dissolved 294.2 g of 3,3',4,4'-biphenyltetracarboxylic dianhydride (BPDA), 86.4 g of p-phenylenediamine (PDA) and 40.0 g of 4,4'-diaminodiphenyl ether (DDE) in a PDA/DDE molar ratio of 8/2, and they were allowed to react in a nitrogen atmosphere at room temperature under stirring for six hours to form a poly(amic acid) solution with a viscosity of 130 Pa·s poise.

Using a dispenser, the poly(amic acid) solution was applied with a thickness of 430 μm to the inside surface of a cylindrical mold with an inner diameter of 400 mm and a length of 600 mm, and then the mold was rotated at 1500 rpm for 10 minutes so that a uniform coating surface was obtained. While the mold was rotated at 250 rpm, hot air at 60° C. was blown to the outside of the mold for 15 minutes, and then the mold was heated at 150° C. for 30 minutes and subsequently heated to 230° C. at a rate of temperature rise of 2° C./minute. After the mold was cooled, the resulting belt was released from the inside surface of the mold. The resulting belt was 500 mm long. The belt was inserted into a mirror-finished surface type aluminum mold with an outer diameter of 398 mm and heated to 400° C. at a rate of temperature rise of 5° C./minute and heated at 400° C. for 30 minutes. After the solvent was removed, the water produced by dewatering cyclization was removed, and imide conversion was performed. The resulting belt was 80 μm in thickness, 400 mm in inner diameter, 0.42 μm in outer circumference surface roughness (Rz), 186 in gloss value, and 420 MPa in tensile strength.

By a dipping method, the surface of the belt was further coated with a solution containing a silicone resin KS-887 (manufactured by Shin-Etsu Chemical Co., Ltd.) diluted to 20% with toluene. The coating was dried at 150° C. for 30 minutes to form a 10 μm-thick release layer. After the release layer was formed, the belt had a surface roughness (Rz) of 0.45 μm and a gloss value of 190.

The resulting fixing belt was installed in a fixing unit of a printing machine. At a speed of 100 ppm, 100,000 sheets of A4-sized paper as recording sheets were subjected to printing with a color toner, and fixing performance and durability were evaluated. As a result, glossy images were obtained, and no anomalies were observed in the belt.

Comparative Example 1

A fixing belt was obtained using the process of Example 1 except that the inner diameter of the belt was set at 200 mm and that a rough surface type aluminum mold was alternatively used. The resulting belt was 80 μm in thickness, 200 mm in inner diameter, 1.20 μm in outer layer surface roughness (Rz), 86 in gloss value, and 400 MPa in tensile strength. A coating of a silicone resin was applied to form a release layer on the belt in the same manner as Example 1. After the release layer was formed, the belt had a surface roughness (Rz) of 1.10 μm and a gloss value of 90. The resulting fixing belt was installed in a fixing unit of a printing machine. As a result of the evaluation, the fixing performance was insufficient, and matte images were obtained.

Comparative Example 2

A fixing belt was obtained using the process of Example 1 except that the molar ratio of PDA/DDE in the varnish for the polyimide resin layer was 10/0 and that a rough surface type aluminum mold was alternatively used. The resulting belt was 75 μm in thickness, 400 mm in inner diameter, 1.10 μm in outer layer surface roughness (Rz), 96 in gloss value, and 650 MPa in tensile strength. A coating of a silicone resin was applied to form a release layer in the same manner as in Example 1. After the release layer was formed, the belt had a surface roughness (Rz) of 1.06 μm and a gloss value of 95. The resulting fixing belt was installed in a fixing unit of a printing machine. As a result of the evaluation, the fixing performance was insufficient, and matte images were obtained.

Comparative Example 3

A fixing belt was obtained using the process of Example 1 except that the molar ratio of PDA/DDE in the varnish for the polyimide resin layer was 4/6 and that a rough surface type aluminum mold was alternatively used. The resulting belt was 75 μm in thickness, 400 mm in inner diameter, 1.24 μm in outer layer surface roughness (Rz), 78 in gloss value, and 100 MPa in tensile strength. A coating of a silicone resin was applied to form a release layer in the same manner as in Example 1. After the release layer was formed, the belt had a surface roughness (Rz) of 1.10 μm and a gloss value of 82. The resulting fixing belt was installed in a fixing unit of a printing machine. As a result of the evaluation, the fixing performance was insufficient, and matte images were obtained, and the belt ruptured before the endurance test was completed.

TABLE 1

|  | Example 1 | Comparative Example 1 | Comparative Example 2 | Comparative Example 3 |
|---|---|---|---|---|
| Molar Composition Ratio (PDA/DDE) | 8/2 | 8/2 | 10/0 | 4/6 |
| Inner Diameter of Belt (mm) | 400 | 200 | 400 | 400 |
| Surface Roughness (Rz) (μm) | 0.42 | 1.20 | 1.10 | 1.24 |
| Glossiness (Gloss Value) | 186 | 86 | 96 | 78 |
| Surface Roughness (Rz) After Release Layer Formation (μm) | 0.45 | 1.10 | 1.06 | 1.10 |
| Glossiness (Gloss Value) After Release Layer Formation | 190 | 90 | 95 | 82 |
| Tensile Strength (MPa) | 420 | 400 | 650 | 100 |
| Fixing Performance and Durability Test | Glossy Images, No Anomalies | Insufficient Fixing Performance, Matte images | Insufficient Fixing Performance, Matte images | Insufficient Fixing Performance, Matte images, Rupture of Belt |

The results in Table 1 indicate that in Example 1 with a belt inner diameter of at least 300 mm and a belt surface roughness (Rz) of at most 1 μm, glossy images were obtained, and no anomalies occurred in the belt even when 100,000 sheets of paper were fed at a speed of 100 ppm. In contrast, in Comparative Examples 1 to 3 with a belt inner diameter of less than 300 mm or a diamine composition ratio outside the specific range and with a belt surface roughness (Rz) of more than 1 μm, image fixing performance was insufficient, and matte images were produced. In Comparative Example 3, the belt also ruptured.

What is claimed is:

1. A color image fixing belt, comprising a belt which is made of a polyimide resin and has an inner diameter of no less than 300 mm and whose outer circumference surface has a surface roughness (Rz) of 0.8 μm or less, wherein the belt is made of a copolymer comprising 3,3'4,4'-biphenyltetracarboxylic dianhydride (BPDA), p-phenylenediamine (PDA) and 4,4'-diaminodiphenyl ether (DDE), wherein the molar composition ratio of PDA and DDE (PDA/DDE) is in the range of 5/5 to 9/1.

2. The color image fixing belt according to claim 1, wherein the outer circumference surface of the belt has a gloss value of no less than 100 with respect to glossiness measured at a light receiving angle of 20°.

3. The color image fixing belt according to claim 1, wherein the belt has a tensile strength of no less than 150 MPa.

4. The color image fixing belt according to claim 1, further comprising at least a release layer stacked on the outer circumference surface of the belt, wherein the release layer is made of a resin selected from the group consisting of a silicone rubber and a silicone resin.

* * * * *